United States Patent [19]

Knauer

[11] Patent Number: 5,445,661
[45] Date of Patent: Aug. 29, 1995

[54] MELTING END FOR GLASS MELTING FURNACES WITH SOLDIER BLOCKS AND OPERATING PROCESS THEREFOR

[75] Inventor: Adolf Knauer, Lohr am Main, Germany

[73] Assignee: Beteiligungen Sorg GmbH & Co. KG, Lohr am Main, Germany

[21] Appl. No.: 50,442

[22] PCT Filed: Nov. 29, 1991

[86] PCT No.: PCT/EP91/02260

§ 371 Date: May 13, 1993

§ 102(e) Date: May 13, 1993

[87] PCT Pub. No.: WO92/10434

PCT Pub. Date: Jun. 25, 1992

[30] Foreign Application Priority Data

Dec. 12, 1990 [DE] Germany .................. 40 39 601.0

[51] Int. Cl.6 ............................................. C03B 5/44
[52] U.S. Cl. ..................................... 65/17.1; 65/355; 65/347; 65/171
[58] Field of Search ............... 65/355, 347, 17, 135, 65/171, 374.13; 432/248; 110/336

[56] References Cited

U.S. PATENT DOCUMENTS

| | | | |
|---|---|---|---|
| 811,223 | 1/1906 | Houze | 432/248 |
| 1,237,282 | 8/1917 | Bergman | 432/248 |
| 1,946,083 | 5/1933 | Lambie | 432/248 |
| 2,092,560 | 9/1934 | Stewart | 432/248 |
| 2,163,405 | 6/1939 | McKelvey | 432/248 |
| 2,377,080 | 5/1945 | Haibach | 432/248 |

FOREIGN PATENT DOCUMENTS

| | | | |
|---|---|---|---|
| 863850 | 2/1971 | Canada | 65/374.13 |
| 288778 | 3/1913 | Germany . | |
| 2557242 | 3/1977 | Germany | 65/374.13 |
| 240538 | 11/1986 | Germany . | |
| 3705062 | 9/1987 | Germany . | |
| 0962218 | 9/1982 | U.S.S.R. | 65/347 |
| 0992433 | 1/1983 | U.S.S.R. | 65/347 |
| 992433 | 1/1983 | U.S.S.R. . | |
| 1546439 | 2/1990 | U.S.S.R. | 65/347 |

OTHER PUBLICATIONS

The Handbook of Glass Manufacture, Tooley F. V., pp. 454–8 to 454–9, 1984, Ashlee Publishing.
"Glasschmelzöfen Konstruktion und Betriebsverhalten," Trier, Springer-Verlag, 1984, pp. 126–128.

*Primary Examiner*—W. Gary Jones
*Assistant Examiner*—John Hoffmann
*Attorney, Agent, or Firm*—Felfe & Lynch

[57] ABSTRACT

In a glass melting furnace, a combination includes a tank having an end chamber for containing a glass melt, the tank having soldier blocks arranged side-by-side which are of a refractory, mineral material and form a wall of the end chamber. The soldier blocks have an inner side facing the end chamber and an outer side facing away from the end chamber. The soldier blocks have a rectangular cross-section at least in a bottom region thereof and the soldier blocks reach upwardly above an established level line of the glass melt. The combination includes a plurality of cooling air nozzles which are directed at the outer side of a plurality of the soldier blocks. The soldier blocks individually have on their outer side recesses diminishing a thickness cross section in thickness direction. As corrosion of the soldier blocks progresses, refractory supplementary elements are insertable into the recesses. Each recess is disposed at an upper end of each soldier block. Each soldier block is step shaped with at least two steps by which the cross section of the soldier blocks is reduced abruptly in an upwardly direction. The combination includes supplementary elements for steps of the soldier blocks. The supplementary elements are complimentary to the recesses. The supplementary elements are insertable successively in the recesses and the supplementary elements are a material corrosion-resistant to glass.

16 Claims, 8 Drawing Sheets

MELTING END FOR GLASS MELTING FURNACES WITH SOLDIER BLOCKS AND OPERATING PROCESS THEREFOR

BACKGROUND OF THE INVENTION

The invention relates to a melting end for glass melting furnaces having an end chamber for containing molten glass, having soldier blocks arranged side by side consisting of a refractory mineral material and surrounding the end chamber, with an inner side facing the end chamber, an outer side facing away from the end chamber, and a rectangular cross section at least in their lower region, and projecting upward above the established surface of the molten glass, the melting end also having cooling air nozzles which in the upper area of the soldier blocks are aimed at the outer side of the latter.

The said soldier blocks usually are in the shape of parallelepipedons whose longest axis is vertical and which surround the chamber in a gap-less and continuous row. The soldier blocks are usually made by casting electrically melted mineral materials such as quartz sand, for example, calcined clay, zirconium silicate, mixtures of mostly $Al_2O_3$, $ZrO_2$, and $SiO_2$ (with traces of $Na_2O$ and Fe). The temperature of the molten glass is between about 1300° and 1600° C., depending on the kind of glass. The soldier blocks, however, are subjected not only to considerable thermal stress but also to corrosion which is greatest in the region of the surface of the molten bath, the so-called level line. The corrosion also depends on the kind of glass in use.

In spite of a wall thickness of 250 to 350 mm, the life of such soldier blocks is between about 4 and 10 years, according to the kind of glass and the furnace throughput. In this period the material of the soldier blocks is worn away principally in the area of the level line, except for a small remnant of about 50 to 100 mm. The so-called "furnace campaign" is then ended if patching is not done. The molten glass must be let out and the soldier blocks, whose length may be between 800 and 2000 millimeters, depending on the furnace size, have to be replaced. The down time is a very considerable cost factor on account; of the considerable capital that is tied up and the high cost of repairs, but especially due to the loss of production, so that for a long time attempts have been made to prolong the "furnace campaign."

The material of the soldier blocks is a relatively poor heat conductor, which on the one hand reduces the loss of heat through the furnace wall, but on the other hand makes it difficult to cool the inside of the soldier blocks subject to the above-mentioned high temperatures. Usually the soldier blocks are flushed with cooling air in the area of their upper end. The cooling action, however, is poor because of the thickness or depth of the soldier blocks at this point, of about 250 to 350 mm, since a steep temperature gradient develops in the material on account of its poor heat conductivity. As a rule, therefore, the operators of such melting tanks abstain during the first one to two years from turning on the cooling air, and this, of course, accelerates the wear and corrosion. Not until a considerable part of the material of the soldier blocks has worn away is the cooling air started up, so that the retarding action against the corrosion does not start until a later period of time. The requirements for effective cooling on the one hand and sufficient thermal insulation on the other are to some extent diametrically opposite.

A patching method of the kind referred to above is disclosed in Trier's book, "Glas-schmelzöfen Konstruktion und Betriebsverhalten," Springer-Verlag, 1984, pages 126 to 128, in which a fusion-cast repair block is placed on the outer side of the soldier blocks of undiminished cross section as soon as the wash-out in the area of the molten glass surface has advanced to such an extent that a temperature limit on the outer side of the soldier blocks is exceeded. This known measure, however, has no influence on the rate of erosion before the patching is done.

Patent DD-PS 240,538 discloses terminating a sandwich of an inner layer and an intermediate layer, both consisting of refractory material and together serving the function of soldier blocks, below the molten glass level and forming the tank chamber in the area of the molten glass level of superimposed bricks to form a so-called "edge layer." The bricks in question are C-shaped in cross section and carry inserts with cooling passages. No repair of the edge layer is provided for, and to prolong the duration of the furnace campaign it is proposed to construct the edge layer of a relatively thick, highly corrosion-resistant refractory material. After the edge layer has worn out it has to be replaced as a whole.

It is also known, through DE-OS 37 05 062 to place shaped bricks provided with recesses both on the inside and on the outside on top of the soldier blocks above the molten glass surface. The purpose of this measure, however, is to reduce the weight of the superimposed bricks while at the same time improving the thermal efficiency of the furnace. It is not possible to lengthen the useful life of the soldier blocks or the duration of the furnace campaign in this manner, since the shaped bricks are not in contact with the molten glass.

SUMMARY OF THE INVENTION

The invention therefore is addressed to the problem of devising an end chamber of the kind described above which will result in a longer furnace campaign and thus in a more economical operation of the furnace.

The solution of the problem is accomplished according to the invention, in the melting end described above, by the fact that the soldier blocks in the area of the glass surface have on their outer side a recess which decreases their cross section, and which can be filled, as the corrosion of the soldier blocks advances, with supplementary elements made of a material compatible with the soldier blocks and largely resistant to glass.

By the measure taken according to the invention the wall thickness of the soldier blocks is definitely thinner, i.e., less deep in the direction of the heat flow, so that the cooling air right at the beginning of the furnace campaign can be directed against the outer side, preferably stepped downwardly, of the soldier blocks, thereby retarding the progress of the corrosion from the outset. Therefore it is not necessary to wait until an important part of the material of the soldier blocks is corroded before the very energy-consuming cooling can be started up. On the other hand, the at least one recess on the outer side creates the possibility for the recess or recesses to be filled step-wise with supplementary elements, so that in this manner, at a later moment or later moments the original wall thickness—or even a greater wall thickness—can be brought about without, however, thereby impairing the cooling.

The material for the supplementary elements can be the same as is used for the soldier blocks as explained in the introduction.

According to the invention, therefore, the soldier blocks are not "patched," which would require a complete or partial shut-down of the furnace and therefore would require a halt in production and the removal of the molten glass, but material is systematically added in portions to the outer side of the soldier blocks, which can be done while the furnace in running or in brief intervals in which the heating power is only reduced and the cooling is shut off for a limited time, in order to permit re-equipment with the supplementary elements.

Through the solution offered by the invention the furnace campaign is extended by about 2 to 4 years, which results in a considerable reduction of the cost of furnace operation.

The filling out of the at least one recess is preferably performed in each case by one supplementary shaped brick complementary to the particular recess, which has the shape of a block of a size to fit the recess.

Preferably the at least one recess is stepped, so that the supplementary element rests on the step. It is also advantageous if in the soldier block two recesses are present offset step-wise from one another, so that first the innermost recess and then the next, outer recess can be filled, each with a supplementary element. There is, of course, no limit to the number of recesses.

Also the shape of the recesses can be different. Preferably the at least one recess is defined by lateral wings whose outer edges are in line with the outer surfaces at the bottom cross section of the soldier block. The recess or recesses in that case are in the form of open-topped pockets set into the back of the soldier block. A supplementary element or several supplementary elements in succession can be inserted into this pocket or pockets from the outer side. The horizontal cross sections of these (concave) pockets can be oval, semi-elliptical, half-round, rectangular or ribbed.

The said lateral walls are equally flushed by the cooling air during the critical phase of operation and thereby additionally cooled, so that they have a "cooling rib" effect. In the case of a plurality of recesses, the cavity commonly formed on the outer side has to some extent the shape of a flight of stairs between two side walls, the supplementary elements being placed successively from the inside out onto the individual steps of the stairs, and extending all the way to both of the side walls.

It is also possible, however, to make the at least one recess continuous over the entire width of the soldier block, so that the upper end of each soldier block has the shape of a free-standing flight of stairs.

This configuration has the following advantages: improved stability, easy casting of the brick in manufacturing it, load relief by anchoring, and control of the seam against glass leakage.

The shape of the soldier block according to the invention can be produced in different ways: it is possible to cast the soldier block with the at least one recess in a corresponding mold; it is also possible, however, to produce the recesses by a mechanical cutting process.

Usually on the outer side of the soldier blocks there is also a so-called basin insulation which consists of a first layer of fireclay and a second layer of another, lighter insulating material. The basin insulation reaches as a rule up to a height that leaves just enough space under the so-called nose brick for the mounting of the cooling air nozzles.

The thermal insulating slabs of the basin insulation can in an especially advantageous manner be used as supporting elements for additional supplementary elements, that is, if the upper ends of the basin insulation are set to a lower horizontal plane and the space thus obtained is filled up first with individual upper thermal insulating slabs which are successively replaced step by step with single supplementary elements. In this manner the corrosion can take place to a depth beyond the depth of the soldier blocks. Details of this measure are subject of claims 12 to 14 and are further explained in the detailed description.

The invention also relates to a process for the operation of such a melting end, in which the upper edges of the supplementary elements are at substantially the same height as the top edges of the soldier blocks, and in which flushing is performed with cooling air in the vicinity of the surface level line.

For the solution of essentially the same problem, such an operating method is characterized in that the melting end is operated in a first of several phases without a supplementary element in the first recess and with cool air flushing of the back of this recess, and in the at least one succeeding phase an additional supplementary element is inserted into the first and each additional recess, and that the outside of each of the single supplementary elements added is blasted with cooling air. An especially advantageous operating method is characterized in that a) in the first phase thermal insulating filler pieces are in the second recess and above the lower thermal insulation and their top edges are below the cooling air nozzles, and that the melting end b) is operated in a second phase with a first supplementary element in the first recess and with flushing of this supplementary element with cooling air, heat-insulating filler pieces being above the lower thermal insulation with their top edges situated below the cooling air nozzles, c) in a third phase it is operated with a second supplementary element in the second recess and with cooling-air flushing of this supplementary element, filler pieces being situated above the lower thermal insulation with their top edges below the cooling air nozzles, d) in a fourth phase with a third supplementary element above the lower thermal insulation and with cool-air flushing of this supplementary element, a thermal insulating piece being above the lower thermal insulation with its top edge below the cooling air nozzle, and that the melting end e) is operated in a fifth phase with a fourth supplementary element above the lower thermal insulation while this supplementary element is flushed with cooling air.

In an especially advantageous manner, the time for the use of each following supplementary element can be determined by detecting the temperature of the surface being air-blasted in each case. This can be performed visually by observing the outside wall of the component in contact with the molten glass and determining the temperature related to the incandescent color.

Additional advantageous embodiments of the subject matter of the invention will appear from the rest of the secondary claims.

BRIEF DESCRIPTION OF THE DRAWINGS

An exemplary embodiment of the subject matter of the invention will be explained with the aid of FIGS. 1 to 12.

DESCRIPTION OF THE PREFERRED EMBODIMENT

Figure 1:
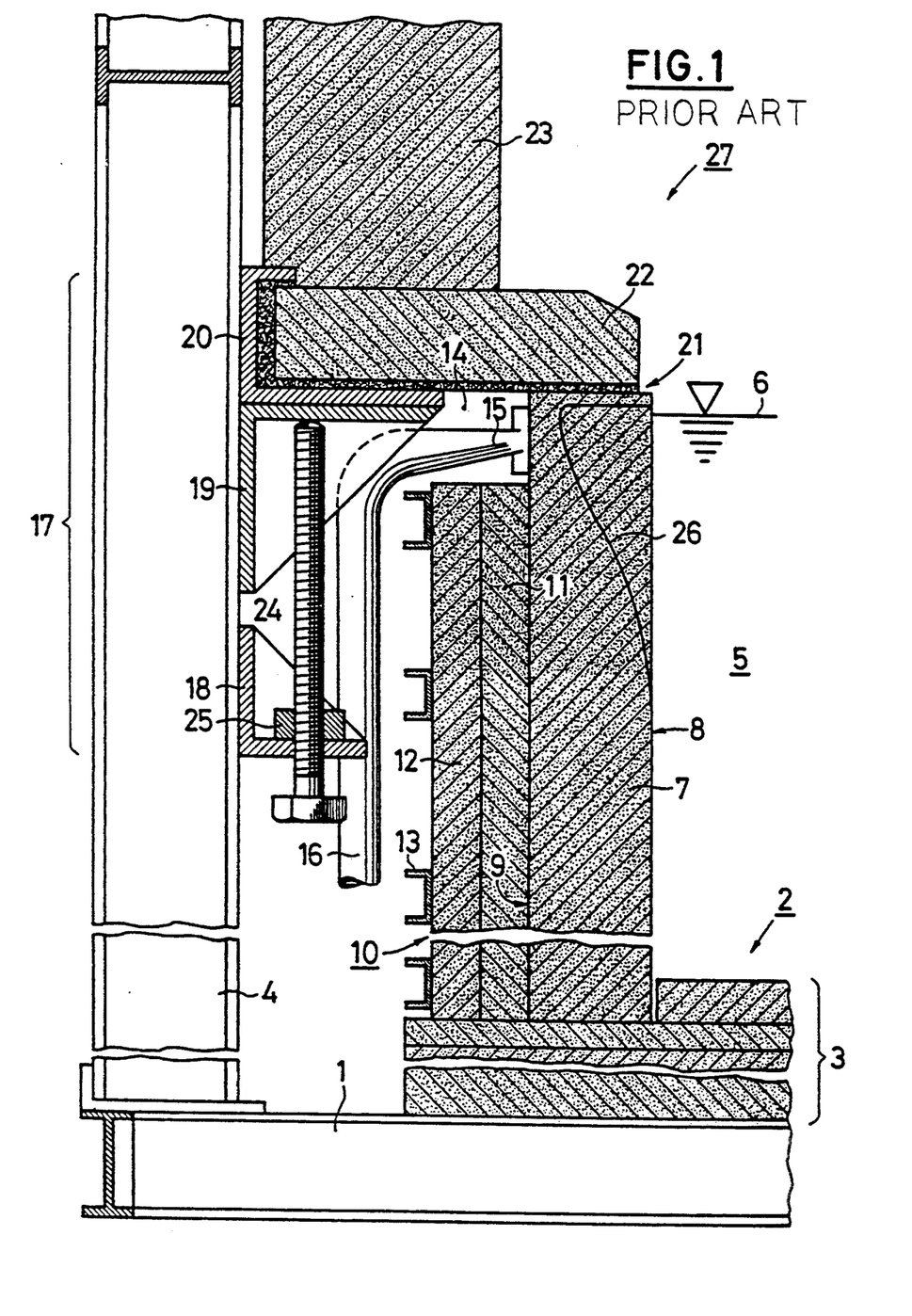
FIG. 1 presents a vertical section through a side wall of a glass melting furnace according to the state of the art, FIG. 2 a similar vertical section through a melting end according to the invention at the beginning of the first phase of operation, FIG. 3 a vertical section similar to FIG. 2 at the start of the second phase of operation, FIG. 4 a vertical section similar to FIG. 2 at the start of the third phase, FIG. 5 a vertical section similar to FIG. 2 at the start of the fourth phase, FIG. 6 a vertical section similar to FIG. 2 at the start of the fifth phase of operation, FIG. 7 a section through the subject of FIG. 8 along line VII—VII, FIG. 8 a section through the subject of FIG. 7 along line VIII—VIII, FIG. 9 a top view of a soldier block with two parallelepipedal recesses according to FIGS. 7 and 8, FIG. 10 a top view of a soldier block with two recesses of trapezoidal shape in plan, FIG. 11 a top view of a soldier block with recesses reaching over the entire width, and FIG. 12 a detail of a plan view of a wall of soldier blocks in accordance with the invention.

In FIG. 1 there is represented a platform 1 consisting of I-beams, for a tank bottom 2 which consists of a plurality of layers 3, not individually identified, made of various refractory mineral materials. On the platform 1 rests a tank frame which consists of numerous columns 4 of I-shaped cross section. To the columns 4 there are fastened the components described below.

Above the tank bottom 2 is an essentially parallelepipedal melting chamber 5 which is filled with molten glass up to a level line 6. The melting chamber 5 is surrounded by a continuous row of soldier blocks, each having an inner side 8 facing the melting chamber and an outer side 9 facing away from the melting chamber. Each soldier block is in the shape of a slender parallelepipedon whose longest axis is perpendicular.

On the outer side is the basin insulation 10 which consists of first heat-insulating slabs 11 and second heat-insulating slabs 12. The whole system is held by channels 13.

The basin insulation 10 is lower in height than the soldier blocks 7, so that in the upper part there remains a gap 14 in which numerous cooling air nozzles 15 are situated whose orifices are directed at the exposed outer side 9 of each soldier block 7. The cooling air nozzles 15 are connected by an adjustable duct 16 to a blower which is not shown.

To each column 4 there is fastened a supporting structure 17 which consists of a fixed bracket 18 and an adjustable console which is joined by bolts and matching slots, not shown, to the column 4. The console 19 is in turn affixed to a continuous support member 20 in which a nose block 22 is held with the interposition of a refractory fiber mat 21. On this nose block rests the so-called lateral masonry 23, details of which are not represented.

By loosening the bolts of the console 19 and operating screw jacks 24 of which, again, only one is represented, all of the consoles and the components above them can be adjusted for height, for the purpose of compensating for the lengthwise thermal expansion of the soldier blocks 7. Each screw jack 24 is held in a corresponding nut 25.

In FIG. 1 is shown a corrosion line 26 up to which the material of the soldier blocks can erode away, thereby ending the furnace campaign and requiring replacement of the soldier blocks. It can be seen from a consideration of FIG. 1 that at the start of the furnace campaign the distance between the then still flat inner side 8 and the cooling nozzle 15 corresponds to the total depth of the soldier blocks 7, so that the cooling at the start is fairly ineffectual.

FIG. 1 and the figures that follow show an important detail of a melting end 27. In the following figures repetition of the previous numbering will be largely omitted, and the description will have to do essentially with the differences between the invention and the state of the art.

Figure 2:
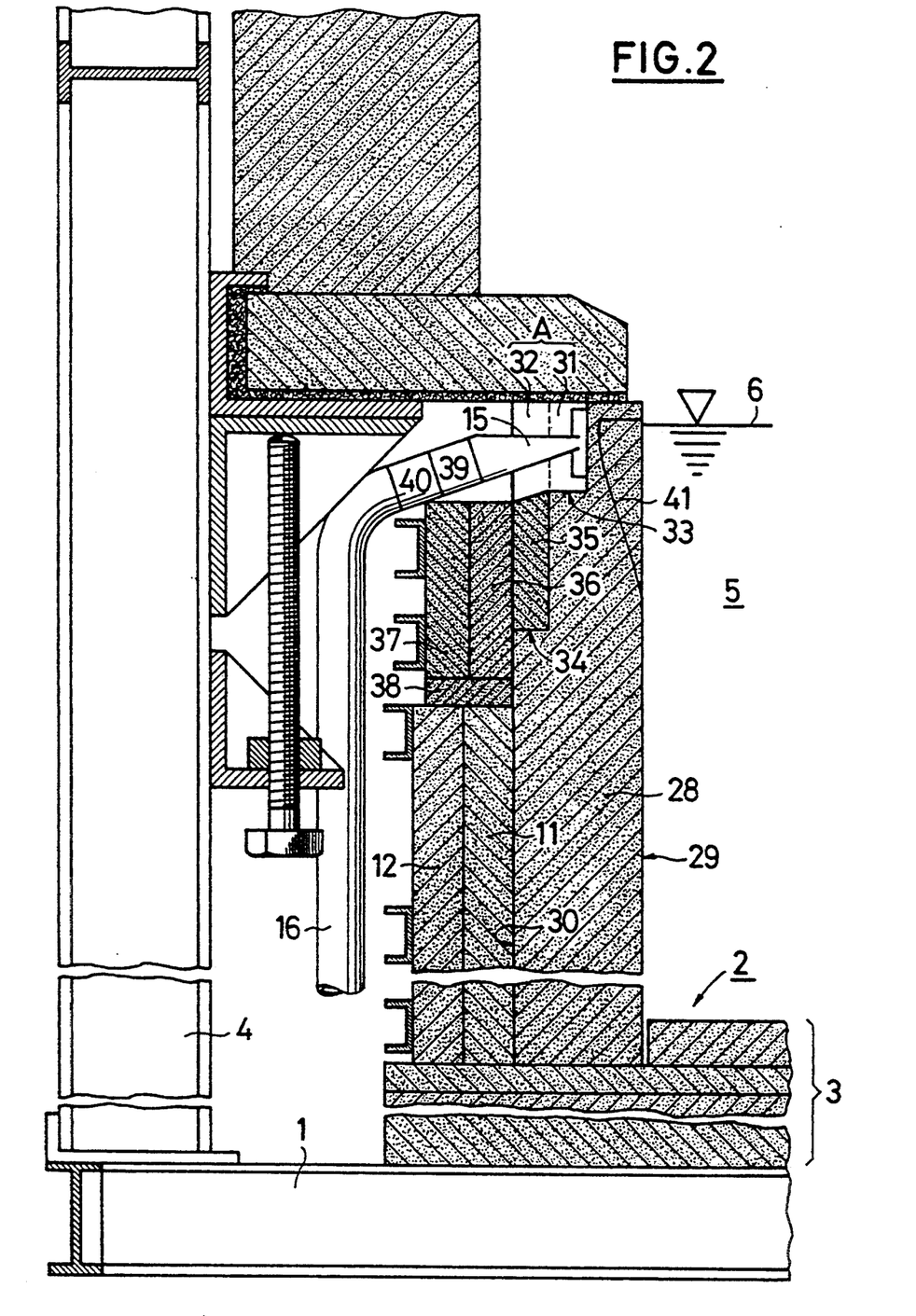

In FIG. 2 is shown a soldier block 28 of different shape, with an inner side 29 and an outer side 30. The soldier blocks 28, however, are provided on the outer side 30, substantially in the area of the level line 6, with two recesses 31 and 32 which diminish the cross section inwardly and extend downwardly each to a step 33 and 34, respectively. In the recessed portion the recesses 31 and 32 form, of course, a common space in which the cooling air nozzle 15 is situated, which is aimed at the back of the recess 31. It can be seen that, due to the recesses 31 and 32 the remaining thickness of the soldier block 28 at the level line 6 is decidedly reduced, for example to a thickness of 100 mm, and that this decidedly increases the effectiveness of the blast of the cooling air. It can furthermore be seen that the bottom part of the less-deep recess 32 is filled by a thermal insulating filler 35 which consists, for example, of fire clay. The lower two thermal insulating slabs 11 and 12 are reduced in height and create space for two upper thermal insulating slabs 36 and 37 which rest through a spacer 38 on the lower thermal insulating slabs 11 and 12. The height of the thermal insulating slabs 36 and 37 ends just below the air nozzle 15 and the couplings 39 and 40 between the air nozzle 15 and the duct 16.

In FIG. 2 is shown a corrosion line 41 up to which erosion by the molten glass can be permitted in the first operating phase before the first overhaul of the melting end begins.

Figure 3:
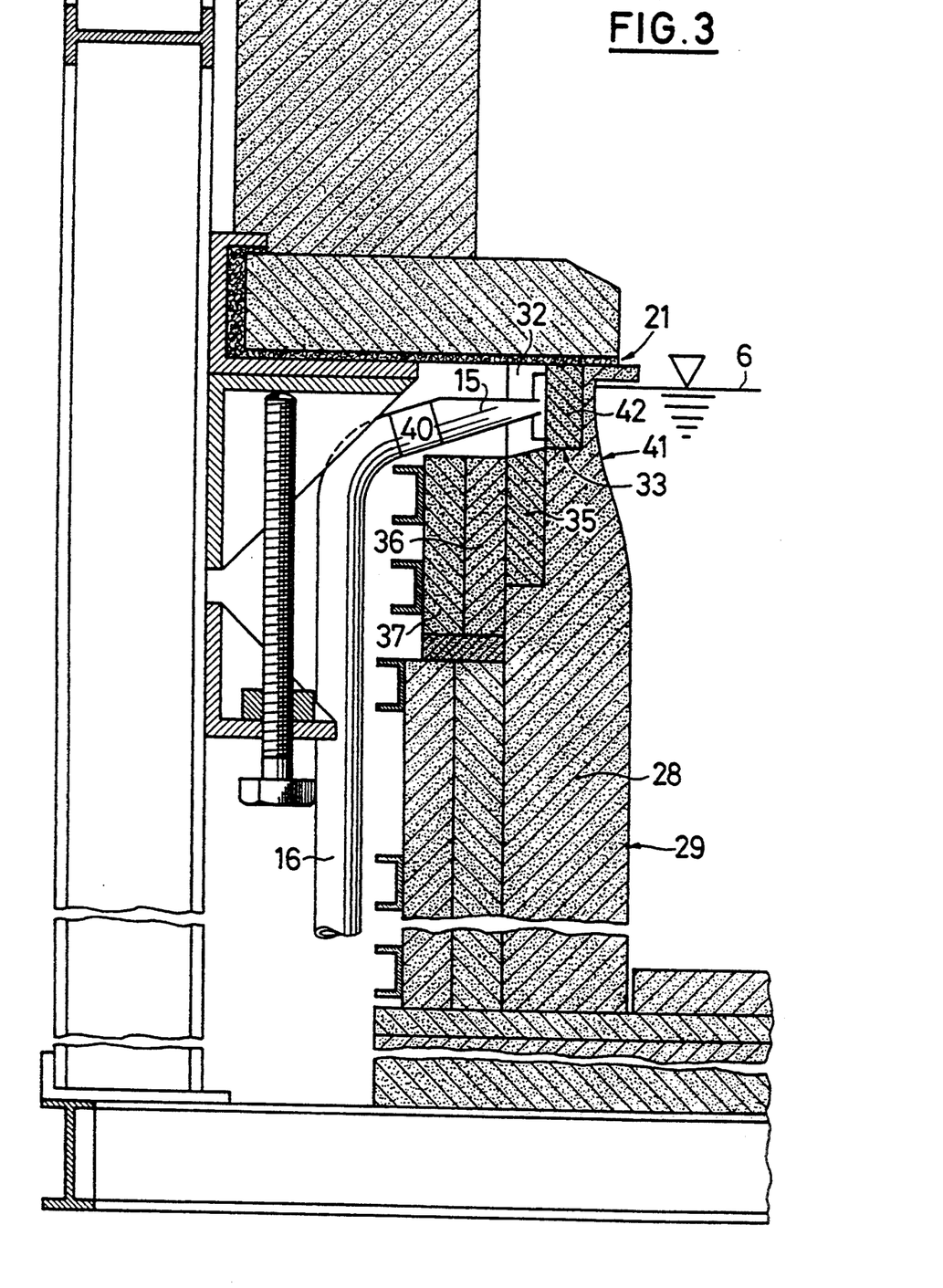

FIG. 3 shows this state after the first overhaul and the beginning of the second phase of the furnace campaign. Into the recess 31 is inserted a first supplementary element 42 which extends over the entire width of the recess 31 and between step 33 and the fiber mat 21. The cooling nozzle 15 has been shifted rearward by a corresponding amount by removing the coupling 39, so that it now blows against the outer side of the supplementary element 42. The quality of the filler 36 and thermal insulating slabs 36 and 37 remains unaltered during this second phase.

Figure 4:
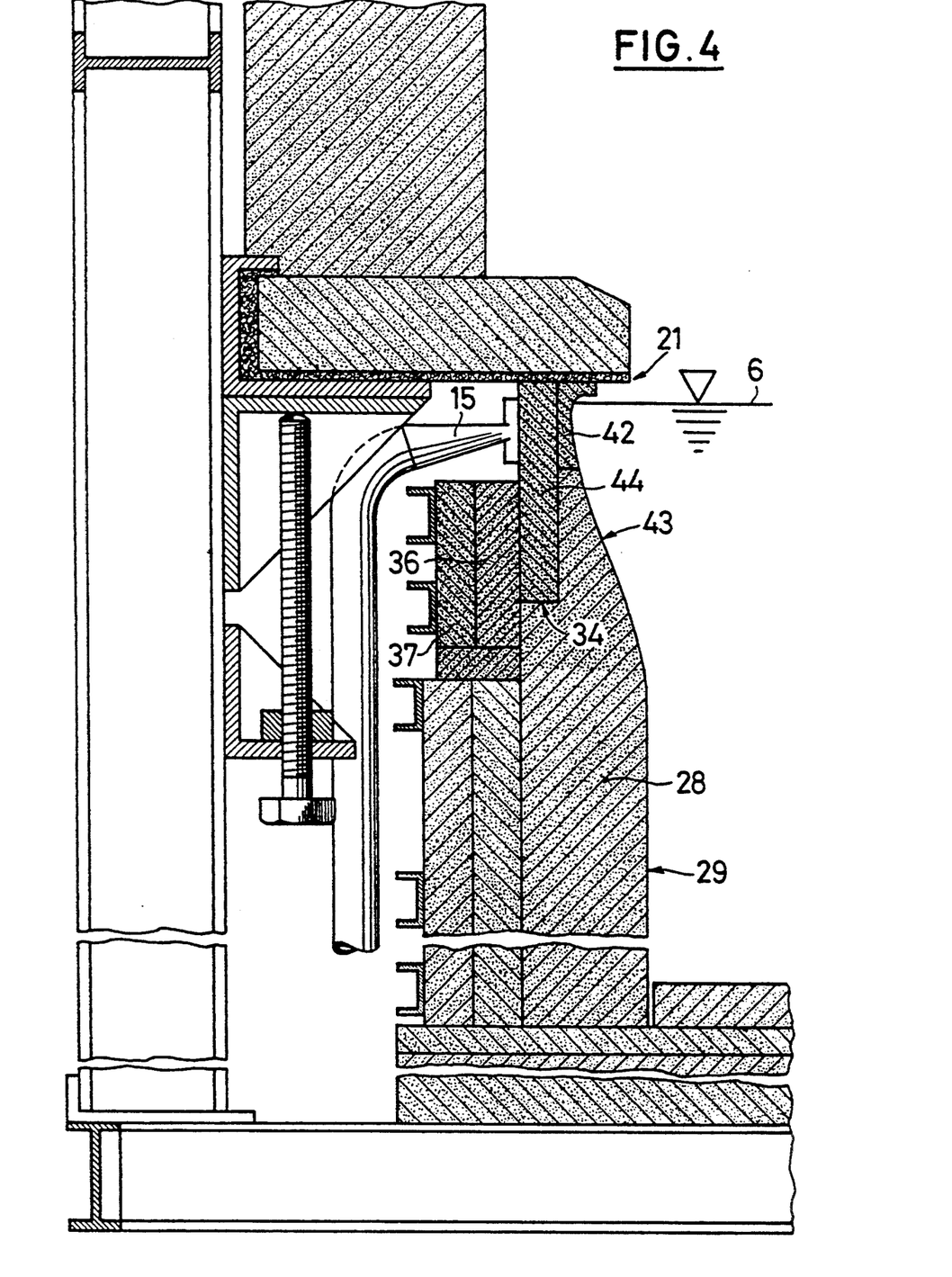

The corrosion can now continue until a corrosion line 43 is reached, as it is represented in FIG. 4. At this time a considerable part of the first supplementary element 42 has been eroded. At this time the filler 35 consisting of fire clay is removed and replaced by a second supplementary element 44 which fills the second recess 32 and extends from the step 34 to the fiber mat 21. The cooling air nozzle 15 is set back by a corresponding amount by removing the next coupling 40 and is now aimed at the outer side of the second supplementary element 44. This second supplementary element 44 is held by the thermal insulating slabs 36 and 37 which have been reinstalled.

Figure 5:
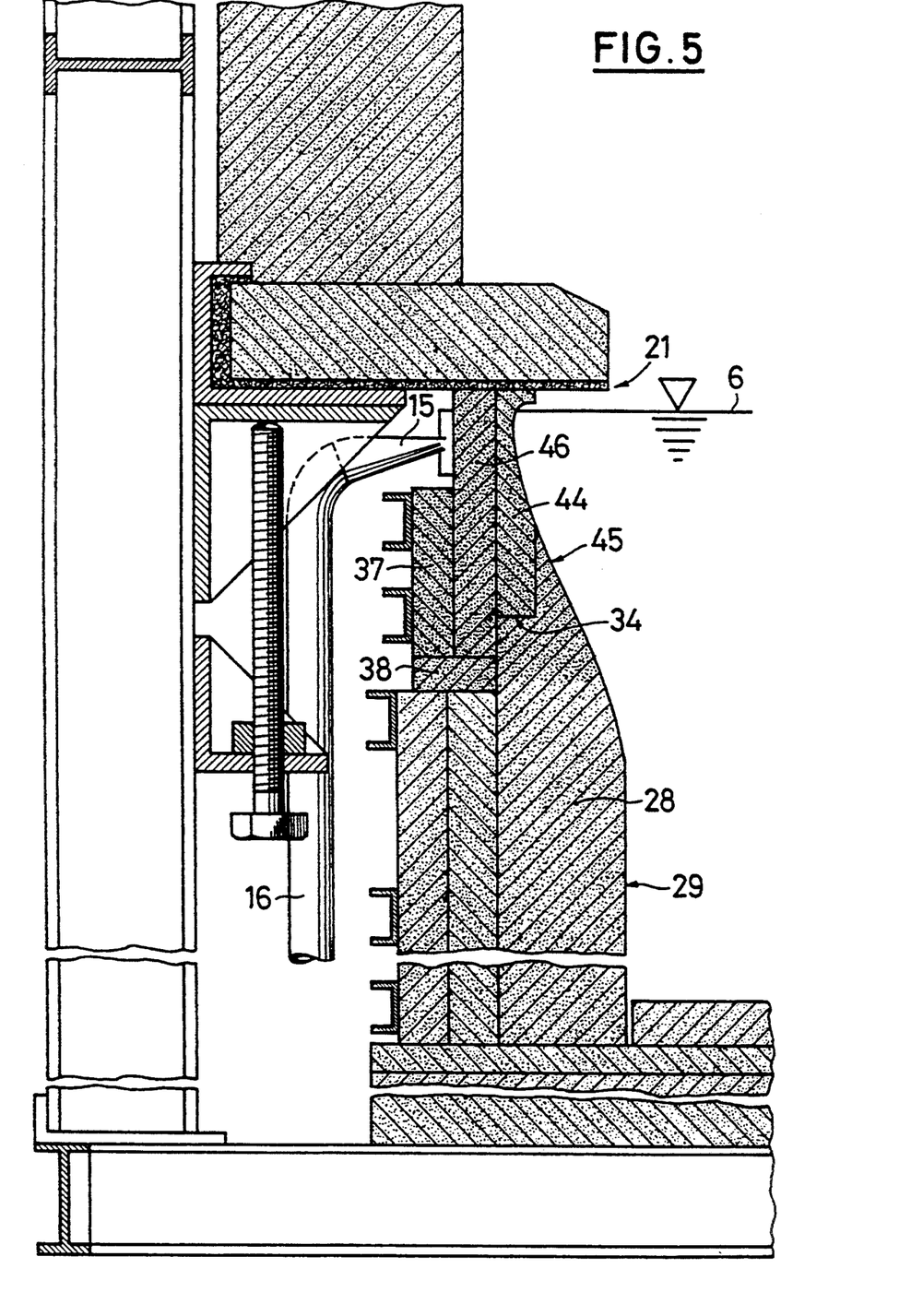

Setting out from this state of assembly, the third phase of the furnace campaign begins, which ends when the when the corrosion line 45 is in the position represented in FIG. 5. In this state the second supplementary element 44 is eroded to a considerable extent.

In the overhaul that follows, the inner, upper thermal insulation slab 36 is replaced by a third supplementary element 46, which has a greater height than the replaced slab and extends all the way to the fiber mat 21. The top edge of the spacer 38 in any case is lower than the step 34. The upper thermal insulating slab 37 is still present and serves to support the third supplementary element 46. The air nozzle 15 is again set back and now blows against upper part of the outer side of the third supplementary element 46.

Figure 6:
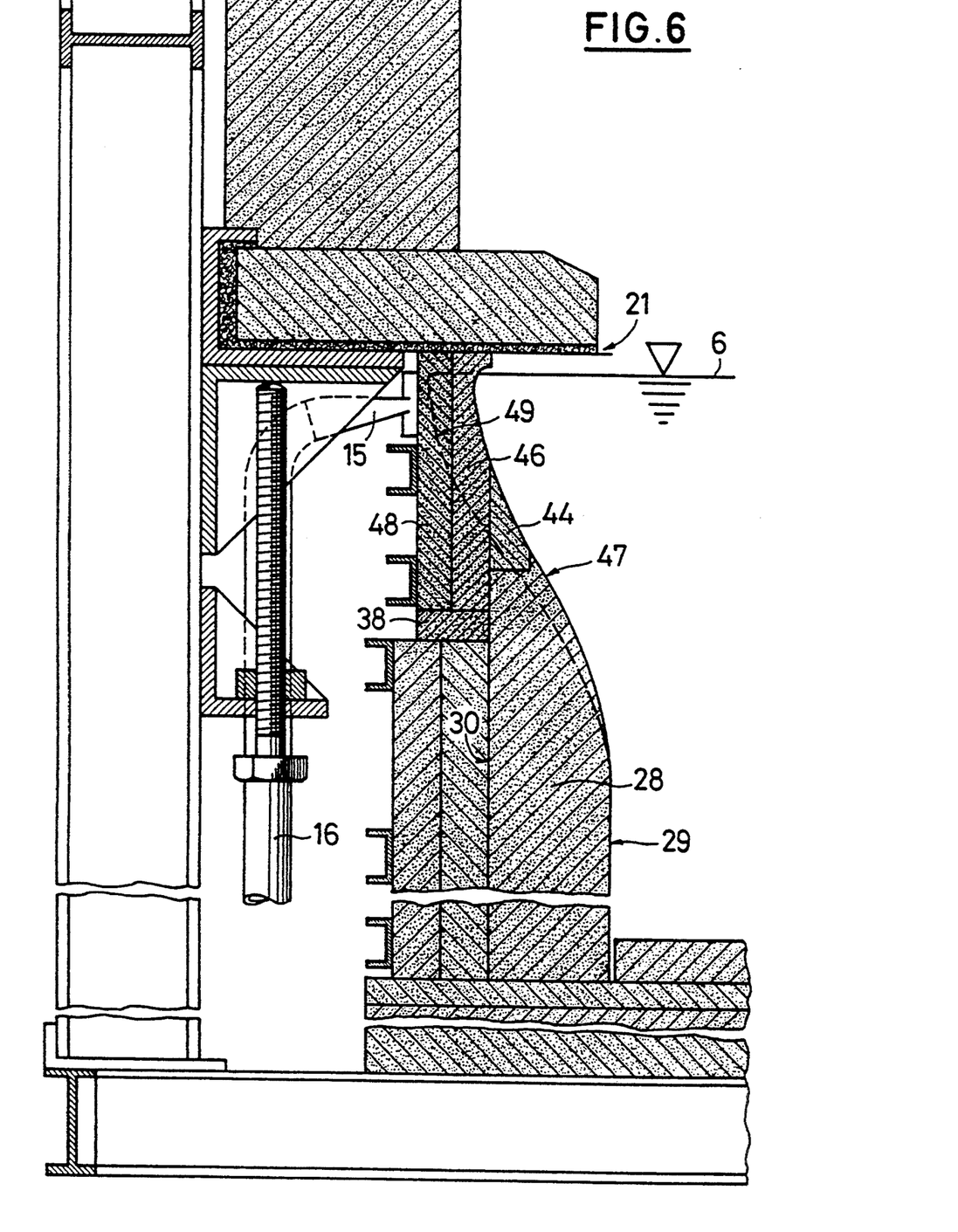

Setting out from the state of assembly in FIG. 5, the furnace campaign can now enter into its fourth phase, the end of which is represented in FIG. 6.

The position of the new corrosion line 47 is represented in FIG. 6. It can be seen that the second supplementary element 44 has already been eroded away except for a small remnant, and that already a considerable part of the third supplementary element 46 has become eroded. It can be seen that, in this stage of the furnace campaign the corrosion line 47 now extends into an area that is on the other side of a vertical plane in which the outer side 30 of the soldier block 29 is situated. With the classical manner of constructing melting ends such a state absolutely cannot be achieved.

At this time an additional overhaul takes place: the outer thermal insulation slab 37 (FIG. 5) is replaced by a fourth supplementary element 48 which reaches from the spacer 38 to the fiber mat 21, i.e., fully supports the outer side of the third supplementary element 46. Setting out from this state of assembly, represented in FIG. 6, the fifth stage of operation takes place. The air nozzle 15 is now directed against the outside of the fourth supplementary element 48, i.e., it is set back again by an additional amount corresponding to the thickness of the supplementary element 48. The furnace campaign can now be continued until another corrosion line 49 is reached, which is represented in broken lines in FIG. 6. The furnace campaign is then ended.

Figure 7:
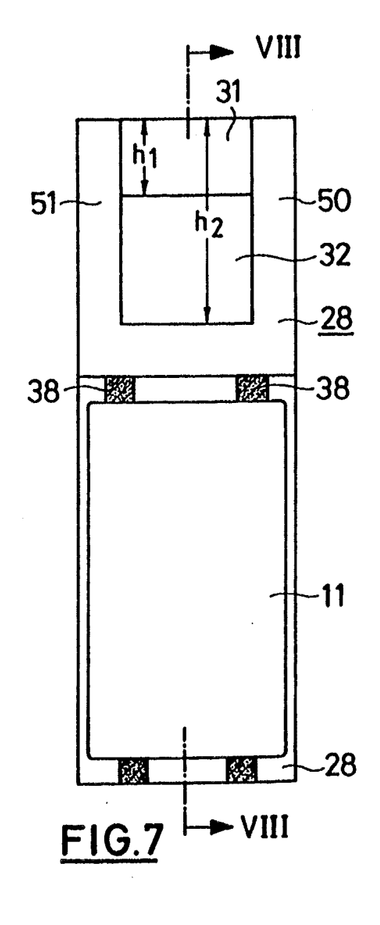
Figure 8:
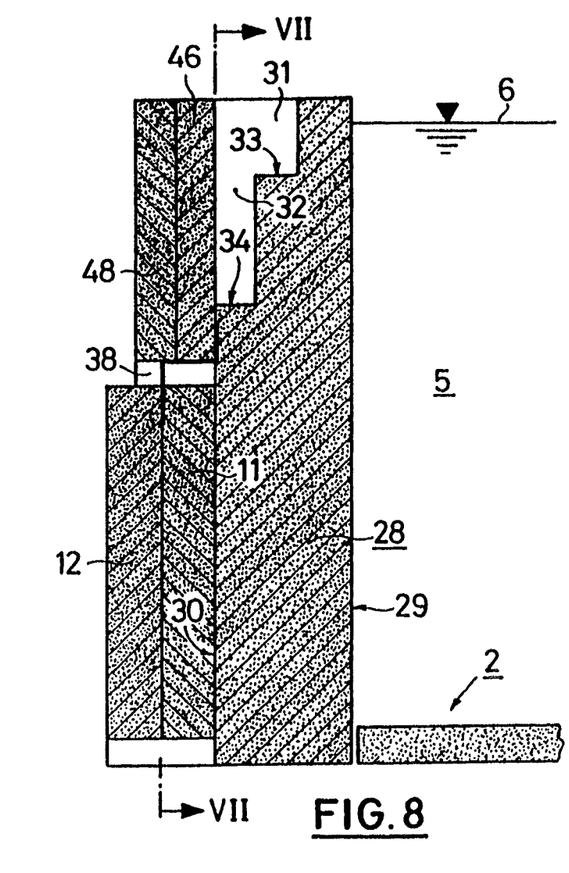
Figure 9:
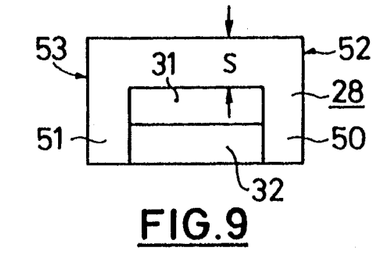

In FIGS. 7, 8 and 9 additional details in the area of a soldier block 28 are represented. It can be seen that the two merging recesses 31 and 32 each form a parallelepipedal cavity and end at the bottom in the steps 33 and 34. On both sides the recesses are defined by lateral wings 50 and 51 which lie between plane-parallel faces. The outer surfaces 52 and 53 align with the outer surfaces in the bottom cross section of the soldier block, so that the soldier blocks can be placed side by side in a continuous row with minimal gaps. In this embodiment the two recesses have each a rectangular cross section in a horizontal plane, as can be seen especially in FIG. 9. As seen in the direction of the corrosion, the wall thickness S at the uppermost end of the soldier block 28 amounts to about 100 mm, and the depth of each recess 31 and 32 amounts, as seen in the same direction, to about 75 mm each, so that the total thickness of the soldier block amounts to about 250 mm. While the thickness of the lower thermal insulation slabs 11 and 12 is about 100 mm, the thickness of the supplementary elements 46 and 48 is reduced at the location of the upper thermal insulating slabs to about 75 mm each.

The height $h_1$ of the first and deepest recess 31 amounts to about 150 mm, and the height $h_2$ of the second, less deep recess 32 amounts to about 400 mm. The height of the supplementary elements 46 and 48 amounts to about 500 mm, so that the gradation corresponds to the arcuate course of the maximum possible corrosion line 49 (FIG. 6). The thickness of the lateral walls 50 and 51 is between 50 and 100 mm. It is obvious that corresponding dimensional rules apply to the supplementary elements 42 and 44, so that they can be inserted into the recesses 31 and 32 and fill them as fully as possible.

Figure 10:
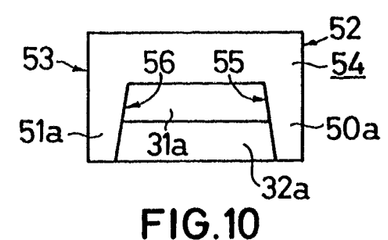

FIG. 10 shows a variant soldier block 54 which differs from soldier block 28 in FIG. 9 only in the fact that the recesses 31a and 32a are defined at the lateral wings 50a and 51a by angled inside surfaces 55 and 56 which give the recesses a trapezoidal cross section in a horizontal sectional plane. It is obvious that the first and second supplementary elements (not shown) will have a complementary cross section. Here too lateral wings 50a and 51a will be present.

Figure 11:
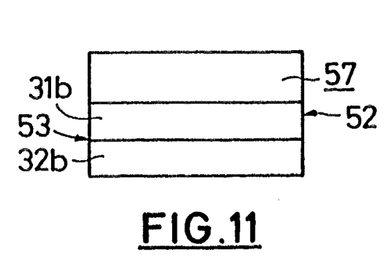

FIG. 11 shows another variant soldier block 57 in which the recesses 31b and 32b run all the way through the width of the soldier block 57. As seen in cross section, the appearance of soldier block 57 is very largely the same as soldier block 28 in FIG. 8, i.e., again steps of correspondingly greater width are present.

Figure 12:
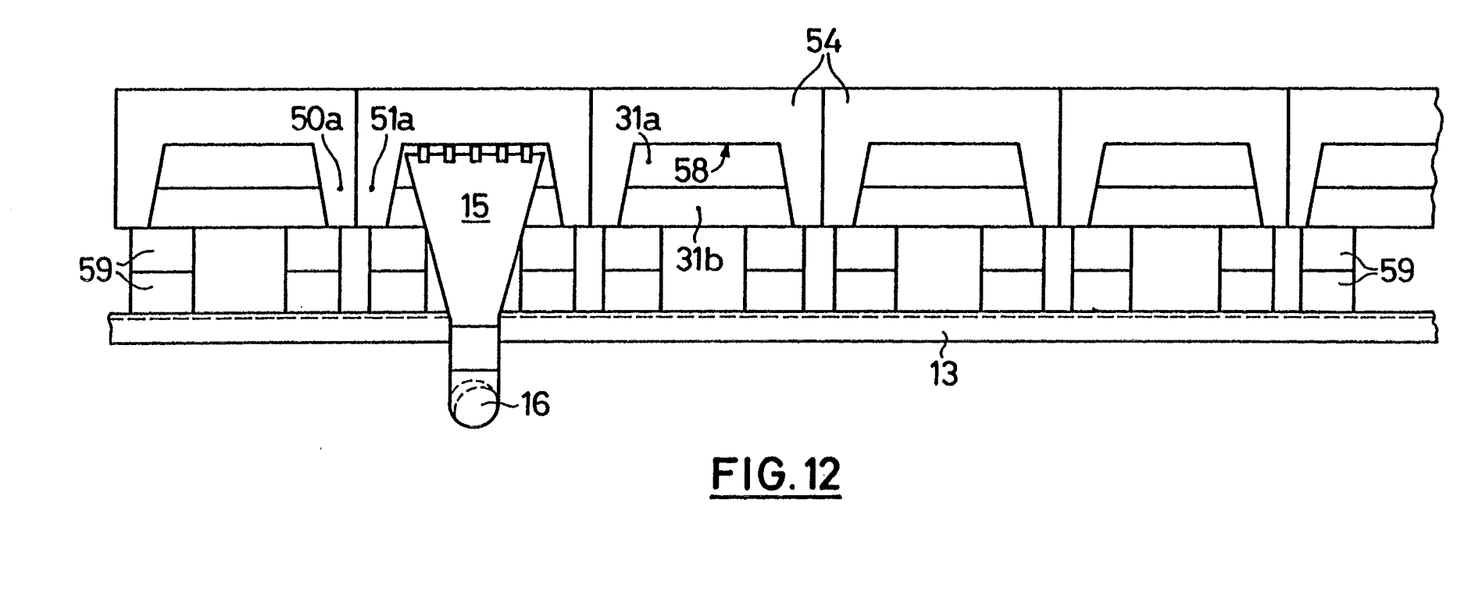

FIG. 12 shows a section of a "soldier block wall" with soldier blocks 54 according to FIG. 10 in the first phase of the furnace campaign. In this phase the air nozzles 15, of which only one is shown, are directed at the back 58 of the first recess 31a parallel to the inner side of the soldier blocks. In this embodiment the upper thermal insulation slabs 36 and 37 of FIG. 2 are replaced with mere spacers 59, which is easily possible in the first two phases. From FIG. 12 it can also be understood that the lateral wings 50a and 51 meeting directly in pairs act also as so-called cooling ribs, since they also are swept by the cooling air on their inner sides.

What is claimed is:

1. In a glass melting furnace, the combination comprising: a tank having an end chamber for containing a glass melt having an established level line, said tank having a wall and a tank bottom, said tank having soldier blocks arranged side by side which are of a refractory, mineral material and form said wall of the end chamber, said soldier blocks having an inner side facing inwardly of the end chamber and an outer side facing outwardly of the end chamber, and said soldier blocks having a rectangular cross section at least in a bottom region thereof at the tank bottom, and said soldier blocks reaching upwardly above said established level line of the glass melt, and said combination including a plurality of cooling air nozzles which are directed in a direction of the outer side of a plurality of the soldier blocks, said soldier blocks individually having on their outer side recesses diminishing a thickness cross section in thickness direction, as corrosion of soldier blocks progresses refractory supplementary elements being insertable into said recesses, wherein each of said recesses is disposed at an upper end of each of said soldier blocks and each of said soldier blocks is step-shaped with at least two steps with a horizontal cross section of the soldier blocks being reduced abruptly in an upwardly direction, and said combination including said supplementary elements for steps of said soldier blocks, said supplementary elements being complementary to portions of said recesses and being disposed successively in said portions of said recesses, and said supplementary elements being of a material corrosion-resistant to glass.

2. The combination according to claim 1, wherein the soldier blocks have lateral walls defining the recesses, said lateral walls having outer surfaces which are in line with outer surfaces of the soldier blocks in regions of the bottom cross sections of the soldier blocks.

3. The combination according to claim 2, in which the soldier blocks have a trapezoidal cross section at said recesses.

4. The combination according to claim 1, in which a plurality of said portions the recesses are continuous over an entire width of one of the soldier blocks.

5. The combination according to claim 4, in which said cooling-air nozzles are directed in a first phase of operation of the soldier blocks in the direction of said soldier blocks at deepest recess portions thereof and in which each other recess portion has a supplementary element comprising a thermal insulating filler piece therein.

6. The combination according to claim 1, in which first supplementary elements are in said recesses and said cooling-air nozzles are directed against said first supplementary elements.

7. The combination according to claim 1, in which second supplementary elements are in said recesses and said cooling-air nozzles are directed against said second supplementary elements.

8. The combination according to claim 7, in which after a moment of corrosion by molten glass on said second supplementary elements and after said second supplementary elements have been replaced by third supplementary elements made from a material corrosion-resistant to the molten glass, said cooling air nozzles are directed against an upper end of said third supplementary elements.

9. The combination according to claim 8, in which after a moment of corrosion by molten glass on said third supplementary elements and after said third supplementary elements have been replaced by fourth supplementary elements made from a material corrosion-resistant to the molten glass, said cooling air nozzles are directed against an upper end of said fourth supplementary elements.

10. The combination according to claim 1, in which lower thermal insulating slabs are disposed adjacent the soldier blocks below the recesses on the outer side of the soldier blocks, and upon said lower thermal insulating slabs upper thermal insulating slabs rest which end directly below said cooling air nozzles and cover the recesses.

11. The combination according to claim 1, in which—in a direction of corrosion—a wall thickness (s) of said soldier blocks in a region of said recesses is between 50 and 150 mm, and the thickness (d) of each supplementary element is between 50 and 100 mm.

12. The combination according to claim 1, in which a height $h_1$ of a first supplementary element is between 100 and 500 mm, a height $h_2$ of a second supplementary element is between 200 and 600 mm, but is greater than the height $h_1$ of the first supplementary element, and a height of a third supplementary element amounts to at least 400 mm, but is greater than a height $h_2$ of said second supplementary element.

13. Operating process for a combination including a tank having an end chamber for containing a glass melt having an established level line, said tank having a wall and a tank bottom, said tank having soldier blocks arranged side by side which are of a refractory, mineral material and form said wall of the end chamber, said wall having an inner side facing inwardly of the end chamber and an outer side facing outwardly of the end chamber, and said soldier blocks having a rectangular cross section at least in a bottom region thereof at the tank bottom, and said soldier blocks reaching upwardly above said established level line of the glass melt, and said combination including a plurality of cooling air nozzles which are directed toward the outer side of a plurality of the soldier blocks, said soldier blocks individually having on their outer side recesses diminishing a thickness cross section in thickness direction, as corrosion of soldier blocks progresses refractory supplementary elements being insertable into said recesses, wherein each of said recesses is disposed at an upper end of each of said soldier blocks and each of said soldier blocks is step-shaped with at least two steps with a horizontal cross section of the soldier blocks being reduced abruptly in an upwardly direction, and said combination including said supplementary elements for steps of said soldier blocks, said supplementary elements being complementary to portions of said recesses and being disposed successively in said portions of said recesses, and said supplementary elements being of a material corrosion-resistant to glass, in which top edges of the supplementary elements are at substantially the same level as top edges of the soldier blocks and in which a cooling air flushing is performed by said nozzles in a region of said level line, and in which the combination operates in a first of several operating phases without first supplementary elements in said recesses, the operating process comprising: cooling air flushing backs of said recesses by said cooling air nozzles, and in at least one subsequent operating phase inserting first supplementary elements into said recesses, and flushing an outer side of the inserted first supplementary elements with cooling air by said cooling air nozzles.

14. Operating process according to claim 13, comprising:
 a) in the first phase, in back of said recesses and above lower thermal insulating slabs, disposing upper thermal insulating slabs having top edges below the cooling air nozzles, and
 b) in a second phase removing said upper thermal insulating slabs and inserting second supplementary elements in the recesses and cooling air flushing said second supplementary elements by said nozzles, additional thermal insulating slabs being situated above the lower thermal insulating slabs with top edges of said additional thermal insulating slabs below the cooling air nozzles.

15. Operating process according to claim 13, comprising: determining time for insertion of each supplementary element by detecting the temperature of a surface of a supplementary element being flushed with air.

16. In a glass melting furnace, the combination comprising: a tank having an end chamber for containing a glass melt having an established level line, said tank having a wall and a tank bottom, said tank having soldier blocks arranged side by side which are of a refractory, mineral material and form said wall of the end chamber, said soldier blocks having an inner side facing inwardly of the end chamber and an outer side facing outwardly of the end chamber, and said soldier blocks having a rectangular cross section at least in a bottom region thereof at the tank bottom, and said soldier blocks reaching upwardly above said established level line of the glass melt, and said combination including a plurality of cooling air nozzles which are directed in a direction of the outer side of a plurality of the soldier blocks, said soldier blocks each having on their outer side at least two recesses diminishing a thickness cross section in thickness direction, as corrosion of soldier blocks progresses refractory supplementary elements being insertable into said recesses, wherein each of said recesses is disposed at an upper end of each of said soldier blocks and each of said soldier blocks is step-shaped with at least two steps with a horizontal cross section of the soldier blocks being reduced abruptly in an upwardly direction, and said combination including said supplementary elements for steps of said soldier blocks, said supplementary elements being complementary to portions of said recesses and being disposed successively in said portions of said recesses, and said supplementary elements being of a material corrosion-resistant to glass.

* * * * *